United States Patent
Fettweis et al.

(10) Patent No.: US 9,167,579 B2
(45) Date of Patent: Oct. 20, 2015

(54) METHOD AND TRANSMITTER/RECEIVER FOR DATA TRANSMISSION WITH FLEXIBLE EXPLOITATION OF TIME AND FREQUENCY DIVERSITY

(71) Applicant: Vodafone Holding GmbH, Dusseldorf (DE)

(72) Inventors: Gerhard Fettweis, Dresden (DE); Nicola Michailow, Dresden (DE); Stefan Krone, Aalen (DE); Michael Lentmaier, Lund (SE); Eckhard Ohlmer, Dresden (DE)

(73) Assignee: Vodafone Holding GmbH, Dusseldorf (DE)

( * ) Notice: Subject to any disclaimer, the term of this patent is extended or adjusted under 35 U.S.C. 154(b) by 226 days.

(21) Appl. No.: 13/724,993

(22) Filed: Dec. 21, 2012

(65) Prior Publication Data
US 2013/0163542 A1  Jun. 27, 2013

(30) Foreign Application Priority Data
Dec. 23, 2011  (EP) .................................... 11010168

(51) Int. Cl.
H04W 72/04 (2009.01)
H04L 27/26 (2006.01)
H04J 1/04 (2006.01)
H04J 1/05 (2006.01)

(52) U.S. Cl.
CPC ............. *H04W 72/044* (2013.01); *H04J 1/04* (2013.01); *H04J 1/045* (2013.01); *H04J 1/05* (2013.01); *H04L 27/265* (2013.01); *H04L 27/2634* (2013.01); *H04L 27/2636* (2013.01); *H04L 27/2649* (2013.01)

(58) Field of Classification Search
USPC ......... 370/203, 210, 312, 319–321, 343–344, 370/478, 480–497
See application file for complete search history.

(56) References Cited

U.S. PATENT DOCUMENTS

2005/0002443 A1* 1/2005 Ozluturk ...................... 375/147

OTHER PUBLICATIONS

Rui et al., "Frequency domain discrete fourier transform spread generalized multi-carrier system and its performance analysis", Computer Communications, Elsevier Science Publishers BV, vol. 32, No. 3, Feb. 25, 2009, pp. 456-464, XP025911744, ISSN: 0140-3664, DOI: 10.1016/J.Comcom.2008.07.006 [retrieved on Oct. 7, 2014].*

* cited by examiner

Primary Examiner — Michael Thier
Assistant Examiner — Eric Myers
(74) Attorney, Agent, or Firm — Mintz Levin Cohn Ferris Glovsky and Popeo, P.C.; Peter F. Corless; Steven M. Jensen

(57) ABSTRACT

A method and corresponding devices for processing and transmitting information are described. A sequence of binary signals is mapped to symbols that forms a two-dimensional matrix of symbols in one of the frequency-time or time-time or time-frequency or frequency-frequency domain and which may be filtered in that domain. Selecting the diagonal elements of said matrix forms a transmit vector.

16 Claims, 3 Drawing Sheets

Figure 2:
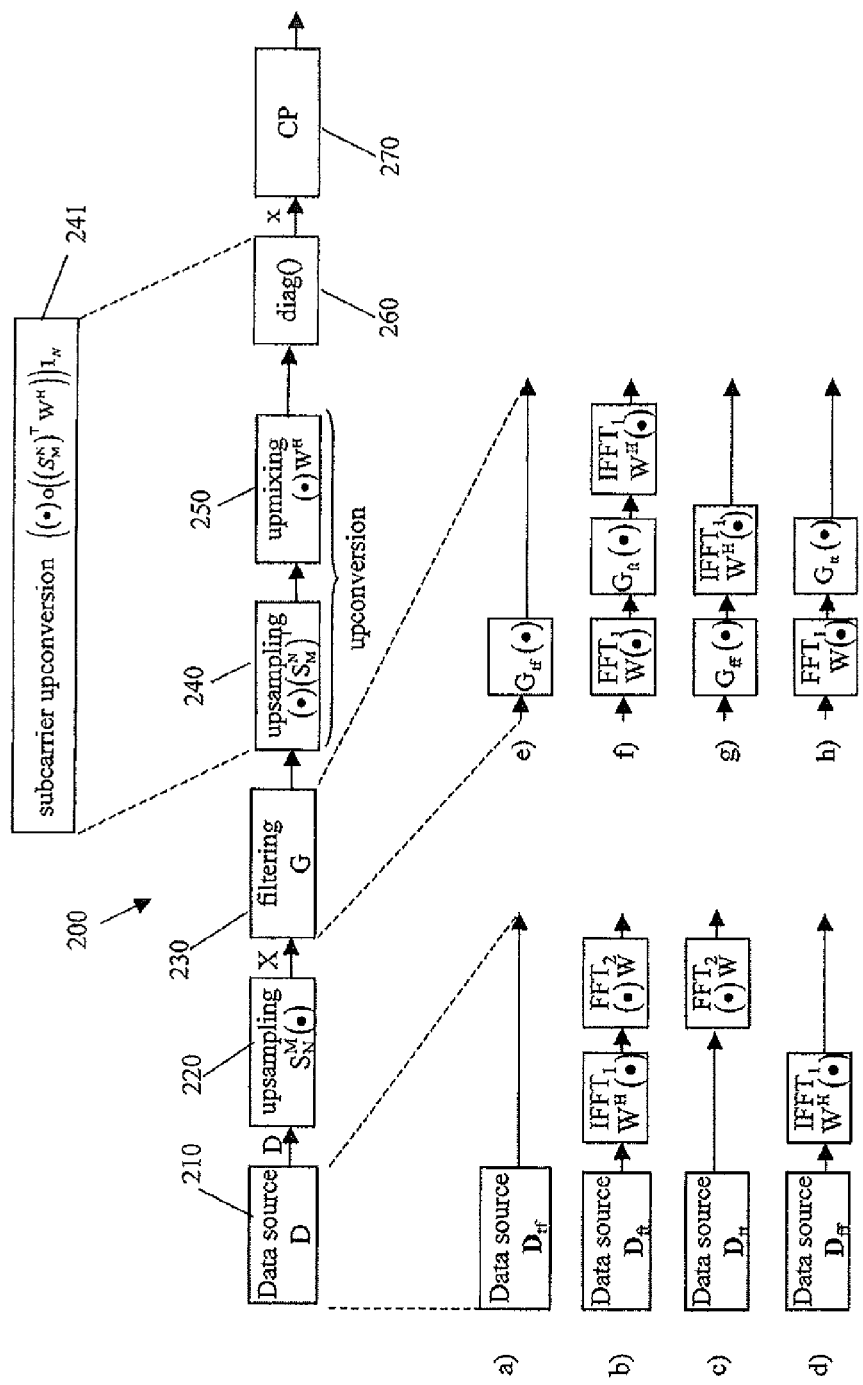

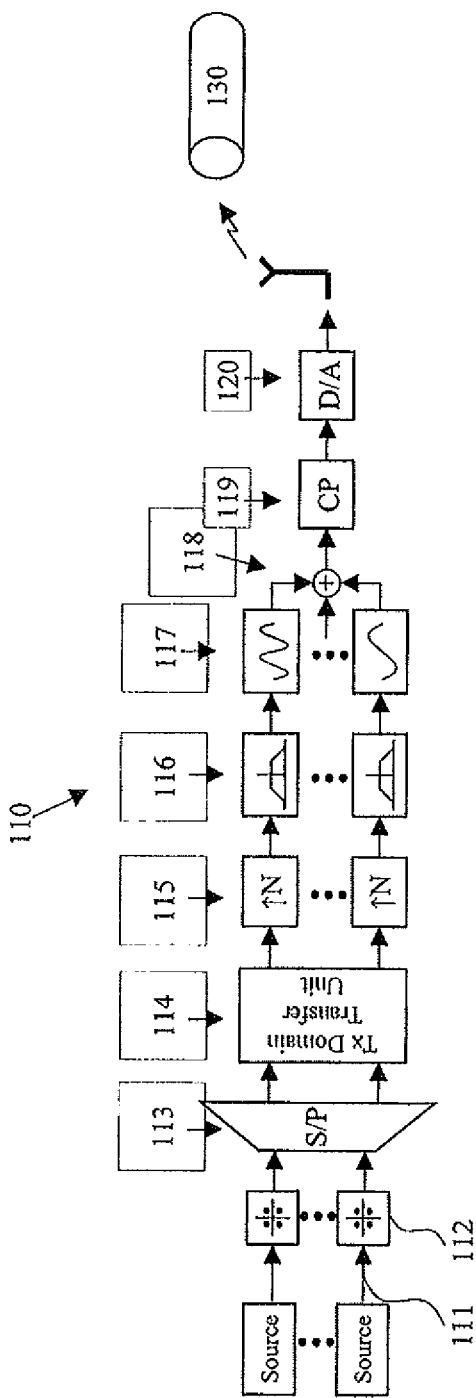
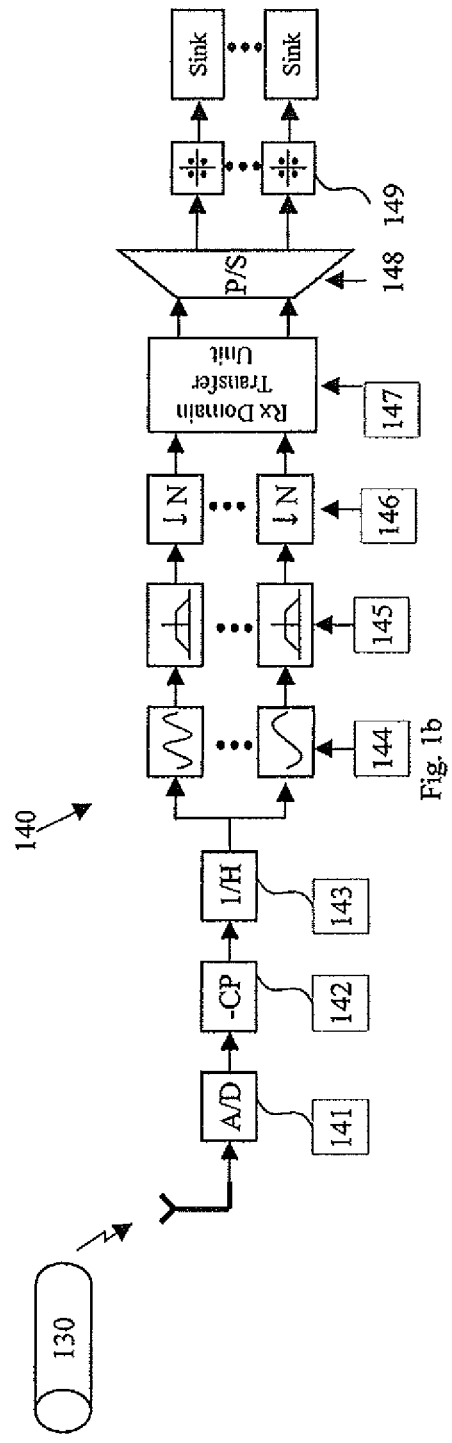
Fig. 1a
Fig. 1b

METHOD AND TRANSMITTER/RECEIVER FOR DATA TRANSMISSION WITH FLEXIBLE EXPLOITATION OF TIME AND FREQUENCY DIVERSITY

CROSS-REFERENCE TO RELATED APPLICATIONS

This application claims the benefit of European Application 11010168.0 filed on Dec. 23, 2011, the entire contents of which is incorporated herein by reference.

The invention relates to a method, a corresponding transmitter and receiver for transmitting data using multi-dimensional Fourier-processing in a multi-carrier communication system.

A majority of today's communication systems employ the orthogonal frequency division multiplexing scheme, in short OFDM. In OFDM an available frequency band is divided into a plurality of smaller frequency subbands of typically equal bandwidths, so-called carriers. In each of the carriers data can be transmitted, wherein each carrier is modulated so that data transmissions in adjacent carriers do not interfere with each other. Accordingly the symbol rate in each frequency band is limited to the bandwidth and signals are shaped by well-known filters. Furthermore, to account for out-of-band leakage, adjacent frequency bands are separated by guard bands, i.e. frequency bands of comparatively small bandwidths, in which no data shall be transmitted. However, even if the bandwidth of guard-bands is smaller than that of bands, transmission resources remain unused.

In many wireless communications standards such as LTE or WiMAX OFDM is favored, since it allows exploiting frequency diversity, offers an efficient implementation with the help of the so-called Discrete Fourier Transform (DFT) and the Inverse Discrete Fourier Transform (IDFT), for which the Fast Fourier Transform (FFT) and Inverse Fast Fourier Transform (IFFT) respectively are well known, efficient realizations. In today's 4G systems, i.e. cellular communications systems of the $4^{th}$ generation, an available frequency band is divided into carriers as described above. Each carrier can be seen to implement a single-carrier system, i.e. one carrier may be allocated for transmitting one stream of data to one user. Thus data of that data stream is transmitted serially using the allocated carrier. In 4G systems an OFDM scheme is used wherein time slots of more than one carrier can be assigned to transmit a single data stream, thus using slots of parallel carriers simultaneously Recent trends in wireless communication impose additional requirements to future wireless communications systems. To protect coexisting systems from interference, for example in cognitive radio use cases, minimized out-of-band leakage is required. Furthermore, agility in terms of being capable to quickly switch frequencies becomes important to aggregate unused frequencies, e.g. frequencies originally designated for television broadcasting having gaps of unused frequency resources as they are offered by the Digital Dividend. On the other hand emerging applications for so-called machine-to-machine communication, i.e. communication with low-complexity terminals, demand future wireless communications systems to serve a huge number of terminals, to be flexible in terms of different levels of user mobility, traffic requirements and quality of service, but also to be energy efficient.

To exploit vacant frequencies using a flexible system the so-called generalized frequency divisional multiplexing system (GFDM), has been proposed, confer "GFDM—Generalized Frequency Division Multiplexing" by Fettweis et al., IEEE VTC spring 2009. The described GFDM system uses a plurality of frequency bands, each comprising a carrier, wherein each carrier is divided into time slots of equal duration. In contrast to OFDM systems, the GFDM system requirements are relaxed. GFDM carriers are modulated individually, wherein some form of quadrature amplitude modulation (QAM) signaling may be used. A cyclic prefix may be inserted after up-sampling, wherein the cyclic prefix may account for the filter length of the digital receive filter and the length of the channel impulse response to reduce inter symbol interference. Thereafter digital pulse shaping may be performed for every sub-carrier to minimize out-of-band radiation. Finally each carrier is digitally shifted to its carrier frequency before transformation into the time domain. As a consequence of an individual signal generation for each carrier, the GFDM system can be interpreted as a plurality of single-carrier cyclic prefix systems realized in the digital domain. GFDM carriers are not necessarily orthogonal but may exhibit mutual interference, which can be adjusted by individual filters on the transmit side and signal bandwidths.

Since the GFDM system is for example particularly suitable for exploiting TV-whitespaces, which may exhibit a plurality of interfering signal from adjacent TV signals and which may vary in the time or frequency domain, an improvement to account for these interferences and quickly varying channel conditions is required.

Figure 3:
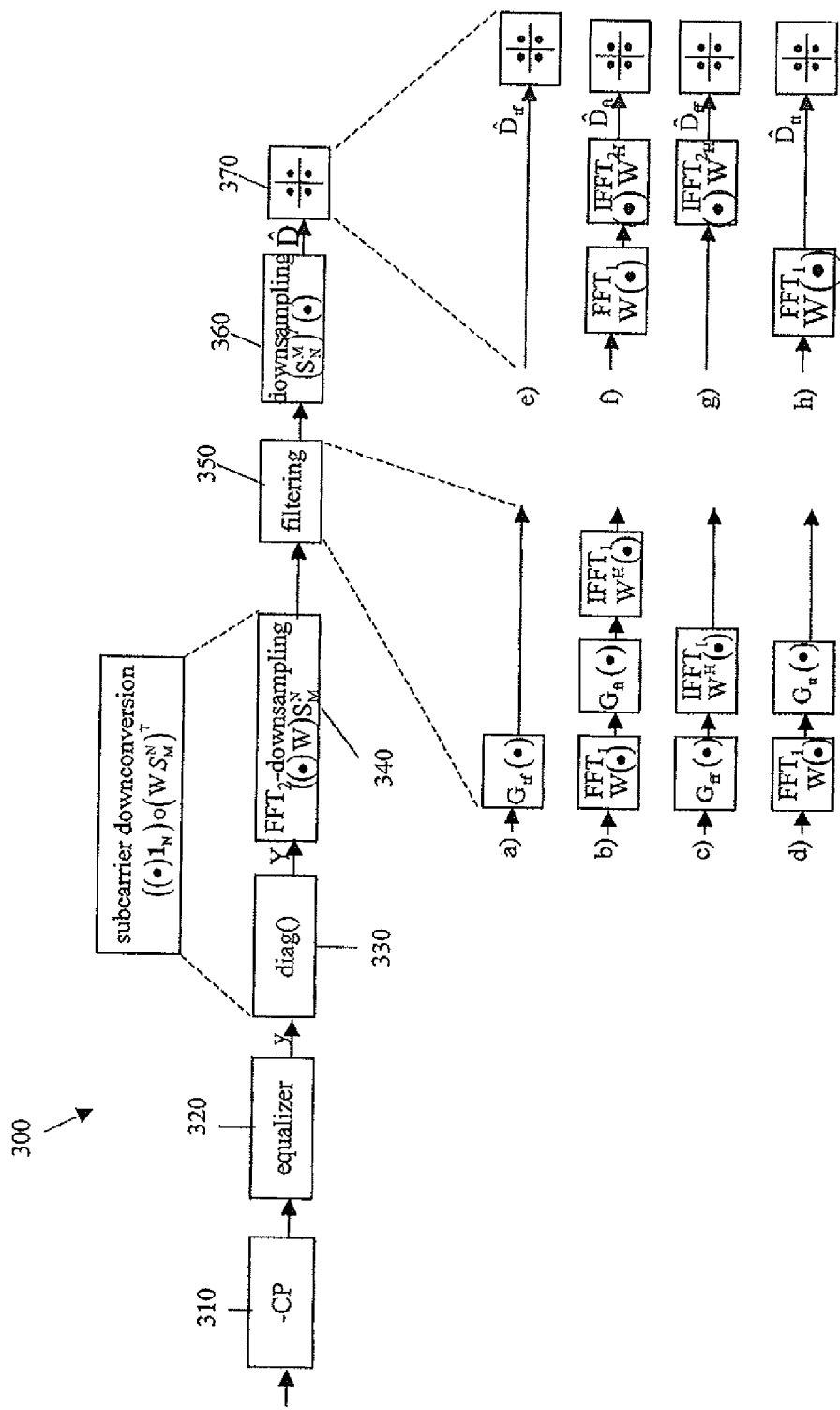

In the following the invention is described with respect to the figures, wherein FIGS. 1a, 1b—depict a schematic of a generalized frequency division multiplexing system comprising a GFDM transmitter and a corresponding receiver;

FIG. 2—depicts a schematic of signal processing in the GFDM transmitter;

FIG. 3—depicts a schematic of signal processing in a GFDM receiver.

FIGS. 1a, 1b depict a schematic of a generalized frequency division multiplexing (GFDM), system comprising a transmitter 110 and a corresponding receiver portion 140 coupled by a channel 130, wherein FIG. 1a depicts a schematic of a transmitter and FIG. 1b depicts a schematic of a receiver. The system schematically depicts a GFDM transmission system adapted and configured for implementing the invention, wherein the figure provides an overview of the processing.

The processing blocks of transmitter 110 may be all digital except for a digital-to-analog converter that converts the transmit signal from a digital representation to an analog signal before that signal is transmitted by a transmit antenna and except for processing blocks arranged in the chain of processing blocks behind that converter. Similarly receiver portion 140 may comprise digital processing blocks only except for an analog-to-digital converter at the radio front end of the receiver and processing blocks arranged in the processing chain before said analog-to-digital converter such as a low-noise amplifier.

In one embodiment a plurality of data sources may output streams 111 of binary data. Each data stream may have an individual data rate. Data bits of streams 111 are mapped to symbols in mappers 112 thus producing streams of symbols. Each mapper 112 may map bits of an inbound stream 111 to symbols using an appropriate constellation, i.e. selected according to the expected channel conditions and data rate and further conditions, thus producing streams of symbols. Note that data streams 111 may originate from a single user or a plurality of users.

In an alternative embodiment the plurality of mappers may be replaced by a single mapper, which may map one or more incoming data streams 111 to symbols.

The symbols as output by mappers 112 are assigned to a plurality of transmit resources, i.e. carriers. In one embodiment this can be achieved by a demultiplexer or serial-to-parallel converter 113 thus producing a plurality of at least two parallel symbol sequences, the parallel symbol sequences thus comprising portions of the symbol sequences output from mappers 112.

The symbols as output from serial-to-parallel converter 113 form a matrix of data symbols, wherein a sequence, i.e. a finite number, of symbols assigned to one carrier may form one column of that matrix. Symbols of one row accordingly are assigned to the same time slot but different carriers. Said matrix accordingly is defined in the time-frequency domain, where the first domain index derives from the rows and the second from the columns.

In one embodiment the symbol matrix may be transformed from the frequency-time domain either to the frequency-frequency domain or the time-time or the time-frequency domain as explained later and with reference to FIG. 2 by applying corresponding transformations to the matrix, i.e. an FFT or an IFFT.

For illustration purposes only the described transmitter may comprise a plurality of parallel processing paths to illustrate the blockwise processing of symbols as described in the following. Note that said processing can be performed using digital values representing the symbols etc., so that the actual processing may be performed using digital signal processing devices, i.e. the digital processing may be implemented using one or more digital processors and a suitable set of instructions, e.g. executable software.

Each of the plurality of parallel processing paths comprises a chain of processing blocks of similar functionality, so the description provided below for one processing path applies to each. However the processing in the paths differs in at least one processing block, i.e. typically the last processing block in a path, which converts the symbols of a sub-sequence to an individual transmit frequency.

In each processing path the symbols are up-sampled in a corresponding processing block 115, thus producing a sequence of up-sampled symbols in each processing path. The processing steps of up-sampling the symbols of each sequence can be performed as a matrix multiplication, as described in more detail below.

Subsequently a transmit filter 116, also known as pulse shaping filter, can be applied to the up-sampled symbols in each processing path, which allows to individually shape the symbols assigned to a carrier, thus producing a sequence of filtered symbols in each path. In one embodiment the pulse shaping filter can be a tail biting transmit filter basically known from "GFDM—Generalized Frequency Division Multiplexing" by Fettweis et al., IEEE VTC spring 2009. Note that the pulse shaping filters 116 applied to the parallel sequences of symbols may differ from each other.

The filtered symbols of each of the parallel symbol sequences are then upconverted in frequency, i.e. converted to their respective carrier frequency using converter devices 117, thus producing sequences of up-converted transmit symbols. The upconverted symbols of each time slot then are combined, i.e., summed up in block 118. Processing block 118 may be an adder that sums up the upconverted symbols.

A cyclic prefix is then added to each sum of upconverted symbols in processing block 119. This is done by prepending in front of each symbol a number of samples that are taken from end of that symbol. Note that instead of a cyclic prefix, also a guard interval could be employed, i.e. a silent gap between the transmission of subsequent symbols. The signal is passed to a digital-to-analog converter 120 to produce an analog transmit signal that is then upconverted to radio frequency, amplified and finally transmitted by an antenna.

Channel 130 transports the analog transmit signal to the antenna of receiver 140, which processes the received radio signal to identify the digital data transmitted, wherein the processing within receiver 140 essentially reverses the processing of transmitter 110.

Note that in the described example the channel is depicted as a wireless channel. However, the invention is not limited in this regard, since the idea relates to processing transmit symbols resulting in a vector of transmit symbols, wherein said vector of symbols can be transmitted as a radio, acoustic, optical, etc. wave or as a signal on a wire. Accordingly channel 130 in one embodiment may be a wireless or a wired channel.

In an early processing step a low-noise amplifier (LNA) comprised in receiver 140 may amplify the received analog signal, a mixer may convert the signal to baseband and analog-to-digital converter ADC 141 may convert the receive signal from analog to digital thus producing an amplified digital signal representing the analog receive signal in baseband. Note that for ease of understanding this model uses a baseband representation of the signal, whereas a practical implementation may alternatively process the signal at an intermediate frequency, thus comprising conventional frequency shifting processing. In the remainder said digital representation of the received signal is called receive signal. Note that said LNA is not depicted in FIG. 1b.

Note that, as mentioned above for the transmitter, the digital processing of the receive signal can be implemented using at least one digital signal processor using a suitable instruction set, e.g. software, wherein processing blocks may be implemented as portions of the software.

Processing block 142 removes the cyclic prefix from the receive signal and processing block 143 equalizes the receive signal. Note that in an alternative embodiment the equalizer may be implemented in each processing path, i.e. branch, individually and may accordingly equalize the signal of a processing path individually. The equalized receive signal is then coupled to a plurality of parallel processing paths. In each of the processing paths the equalized receive signal is down-converted using down-converter processing blocks 144 to produce a plurality of down-converted receive signals, wherein the down-converter processing blocks output receive signals down-converted to the carrier frequencies corresponding to the carrier frequencies used in the transmitter, thus producing a plurality of down-converted copies of the receive signal in each of the parallel processing paths. The down-converted portions of the receive signal then are forwarded to a receive filter 145 to produce filtered copies of the receive signal. In one embodiment receive filter 145 may be a tail biting receive filter corresponding to the tail biting transmit filter comprised in the transmitter.

The filtered copies of the receive signal in each branch of the receiver are down-sampled in block 146 and forwarded to receive domain transfer unit 147. The domain transfer unit may transform the down-converted copies of the receive signal, which form a matrix defined in time-time domain, into the frequency-time domain or the time-frequency domain or the frequency-frequency domain. This can be achieved as a matrix operation as described in more detail below with reference to FIG. 2.

The matrix then is passed to a parallel-to-serial converter 148, which may output one or more symbol sequences comprising the symbols as processed in the plurality of parallel processing paths or processing branches.

Each symbol sequence is passed to a detection block 149 for detecting the symbols transmitted via the plurality of carriers and for de-mapping the symbols. Detection blocks 149 accordingly output outbound streams of binary data, which ideally match the inbound streams of binary data 111 and which are forwarded to data sinks.

Note that the invention is part of a communications system, that can arbitrarily be extended, e.g. by channel encoding, i.e. introducing any redundancy into the transmitted information for error detection and correction, has not been described in the context of this invention. However, conventional channel encoding can be easily introduced into the described system model for example by including a corresponding encoder arranged before the mapper in the transmitter and by including a corresponding decoder after the de-mapper in the receiver portion.

In the following the processing in the plurality of parallel processing paths in transmitter 110 is described in more detail with respect to FIG. 2, wherein the processing blocks reflect the processing in the all digital processing chain of the transmitter.

In FIG. 2 block 210 denotes a block of symbols, i.e. data matrix D that will be processed as a block in transmitter 110. As described above the symbols as output from mapping devices 112 can be arranged by device 113 to form symbol sequences assigned to carriers, i.e. each assigned sequence shall be transmitted on an individual carrier frequency and wherein these assigned symbol sequences form a matrix, i.e. a block, of symbols.

A block of symbols can be denoted as matrix D of symbols $d_{m,k}$ of the assigned sequences and comprises a plurality of symbols per carrier frequency and a plurality of carrier frequencies and accordingly is $$D = \begin{pmatrix} d_{0,0} & \cdots & d_{0,k-1} \\ \vdots & \ddots & \vdots \\ d_{M-1,0} & \cdots & d_{M-1,K-1} \end{pmatrix}$$

wherein $d_{m,k}$ denotes a complex symbol in the m-th time slot, $0 \le m < M$ and $M>1$, of the k-th carrier frequency, $0 \le k < K$ and $K>1$, the block of symbols thus being a M-by-H matrix. In one embodiment said matrix D of symbols represents the data in the time-frequency domain, since each column consists of symbols assigned to a different time and each row consists of symbols assigned to different frequency slots. To denote the representation of the symbols in a domain, i.e. here in the time-frequency domain, said matrix is denoted with corresponding indices, i.e. here as $D_{tf}$.

Note that above given nomenclature is chosen arbitrarily to describe the invention. This particularly relates to the definition of matrices. Any other suitable nomenclature may be chosen to describe the invention disclosed herein, e,g, the indices of the matrices may be changed arbitrarily. Accordingly the chosen nomenclature does not affect the technical teaching of the invention disclosed herein.

Also note that in one embodiment the symbols may be defined in the time-frequency domain as described above. However, the invention is not limited in this regard. In alternative embodiments the symbol matrix may be defined in the time-time or frequency-time or frequency-frequency domain depending on channel conditions to enable a receiver to make use of the best suitable representation domain for detecting the transmitted symbols. For that purpose the matrix of symbols may be transformed to any of these domains by applying appropriate transformations to the matrix as described below, wherein a transformation may be a mathematical operation applied to a matrix of symbols.

In a next processing step the symbols in matrix D are up-sampled by applying an up-sampling matrix $S_N^M$ to increase the sampling rate of the symbols, with an upsampling matrix $$S_N^M = \underbrace{\begin{pmatrix} 1 & 0 & \cdots & 0 & 0 & 0 & \cdots & 0 & & 0 & 0 & \cdots & 0 \\ 0 & 0 & & 0 & 1 & 0 & & 0 & & 0 & 0 & & 0 \\ \vdots & & \ddots & \vdots & \vdots & & \ddots & \vdots & \cdots & \vdots & & \ddots & \vdots \\ 0 & 0 & \cdots & 0 & 0 & 0 & \cdots & 0 & & 1 & 0 & \cdots & 0 \end{pmatrix}^T}_{M \text{ blocks of size } N \times M}$$

Said up-sampling matrix S, here in transposed form, consists of M blocks, each of size N×M. Step 220 corresponds to step 115 of FIG. 1.

Note that in the context of this description the notation $S_N^M(\bullet)$ denotes that matrix $S_N^M$ is applied from the left onto the operand denoted by $(\bullet)$, thus affecting the columns of the symbol matrix for up-sampling. Correspondingly the notation $(\bullet)S_N^M$ denotes that a matrix S, i.e. for down-sampling, is applied from the right onto the operand, thus affecting the rows of the operand.

By up-sampling the symbol matrix D, a new matrix $X=S_N^M D$ is created, where the quantity of samples per sub-carrier is increased, which improves the accuracy of the subsequent filtering, which in turn causes a more accurate modulation of the respective carrier. Note that matrix X contains MK by MK symbols while matrix D comprises M×K samples. The more accurate modulated carriers accordingly exhibit less inter-channel-interference, i.e. ICI, thus improving spectral efficiency.

Subsequently a filter is applied in 230 to the up-sampled symbols in the matrix, which corresponds to the signal shaping step 116 in FIG. 1. The filter values can be fixed (pre-defined) or can be determined based on estimated channel properties in order to signal shape the symbols to mitigate the estimated channel distortions. Filtering the up-sampled symbol values is performed by applying filter matrix G to the matrix of symbols D. Note that filter matrix G may shape the symbols of each frequency individually to cope for channel characteristics specific to one carrier frequency. More specifically for that purpose multiple filters could be used such that different pulse shapes are applied to different subcarriers. In any case and as described below the filtering can be performed in any of the described domains as described in the following.

The sampled impulse response of the pulse shaping filter in the time domain is denoted by $$g = (g_0 \cdots g_{LN-1})^T$$

where L is the filter length and wherein $L \le M$.

$$W = \frac{1}{\sqrt{NW}} \begin{pmatrix} w^{0,0} & \cdots & w^{0,NW-1} \\ \vdots & & \vdots \\ w^{NW-1,0} & \cdots & w^{NW-1,NW-1} \end{pmatrix}$$

is an NM×NM Fourier matrix with elements $$w^{k,n} = e^{-j2\pi \frac{kn}{N}}, \text{ and}$$

N is the number of samples per symbol with N=K in the following considerations.

Note that for an arbitrary matrix A the expression WA is an FFT, i.e. a Fast Fourier Transformation applied "from the left", along the columns of any complex valued matrix A, which in the figures is also denoted as $FFT_1$ or $W(\bullet)$. In contrast thereto the term AW is a FFT along the rows of A, i.e. the Fourier matrix is applied "from the right", and is denoted in the figures as $FFT_2$ or $(\bullet)W$. Accordingly the term WAW is a two-dimensional FFT applied on matrix A, which can be realized by applying matrix A from the left and the right, wherein the order of execution can be exchanged. Consequently any complex valued matrix A can be transformed into any one of the four domains time-time or frequency-time or time-frequency or frequency-frequency. In the context of this description two indices denote the domain of matrix A, e.g. $A_{ft}$ denotes that matrix A is defined in the frequency-time domain.

In the following formulas $\Gamma$ denotes an NM×NM filter matrix containing Wg on its diagonal and zeros otherwise. Furthermore $G=W^H\Gamma W$ denotes a circular convolution matrix that is used for pulse shaping the transmit signal, i.e. the symbols in matrix D.

From the above the following notation for the representation of the symbol data in the matrix can be derived, wherein $D_{tf}=D$ denotes the symbol matrix D in the time-frequency domain, $D_{ff}=WD$ denotes data matrix D in the frequency-frequency domain, $D_{tt}=DW^H$ denotes data matrix in the time-time domain and $D_{ft}=WDW^H$ denotes said data matrix in the frequency-time domain.

Similarly the following notation for the pulse filter is derived. $G_{tf}=W^H\Gamma W$ denotes the pulse shaping filter in the time-frequency domain, $G_{ft}=\Gamma$ denotes the filter in the frequency-time domain, $G_{ff}=\Gamma W$ denotes the filter in the frequency-frequency domain and lastly $G_{tt}=W^H\Gamma$ denotes the filter in the time-time domain.

Referring again to FIG. 2, a filter matrix G is applied to the data matrix in 230, wherein said filtering may be defined in any of the domains. Said filtering corresponds to the pulse shaping 116 in FIG. 1. Note that filtering is performed in the same domain as the symbols in the matrix are provided to filtering processing 230. In one embodiment the symbols of the symbol matrix as well as the filter matrix are provided in frequency-time representation, i.e. in the frequency-time domain. However the processing is not limited in this regard, since filtering of the symbols can be performed in any one of the domains as long as the symbol matrix and filter matrix are provided in the same domain.

The filtered symbols then are up-sampled in 240, which corresponds to block 117 in FIG. 1. Said up-sampling is performed by applying a matrix operation $(\bullet)(S_M^N)^T$, i.e. transposed matrix $S_M^N$ is applied from the right side on the filtered symbol matrix to move the symbols of each row onto the carrier frequency of that row.

Subsequently the symbol matrix is upmixed and transformed into time-time domain in step 260 for transmission by applying an FFT from the right side on the matrix using a hermitian Fourier Matrix, thus producing a symbol matrix $D_{tt}$, i.e. a matrix of symbols in time-time domain.

The up-conversion 117 in FIG. 1 in this way is implemented as an upsampling and an upmixing as illustrated in the figure that at the same time transforms the matrix of symbols into time-time domain as required for transmission.

In method step 260 the diagonal elements of matrix $D_{tt}$ are selected for transmission within one time slot, which corresponds to 118 of FIG. 1, thus forming a vector x of symbols, wherein said x can be written as $$x=\mathrm{diag}(W^H\Gamma W S_N^M D(S_M^N)^T W^H).$$

Note that by selecting the diagonal elements of the matrix containing the upconverted samples X and transmitting only these, the information contained in the non-diagonal elements is not transmitted, thus missing at a receiver. However, the steps of up-sampling and filtering the symbol matrix D have spread the information of each symbol into a diagonal element of X. Furthermore and as illustrated below with respect to FIG. 4, the information contained in one matrix element defined in frequency-time domain can be spread across a plurality of elements of the matrix by transforming into time-time or time-frequency or frequency-frequency domain. The diagonal elements of X, thus comprise at least partially the information comprised in the non-diagonal elements of D. Accordingly a receiver is enabled to recover all information contained in matrix D from the diagonal elements of X only, i.e. the symbols forming the transmit vector.

Note, that the number of elements of D equals the number of elements on the diagonal of X. Thus creating the transmit signal is a process of mapping MK data symbols on MK time samples.

In an alternative embodiment the processing steps of up-converting the matrix of symbols, i.e. steps 240 and 250, and selecting the diagonal elements of the symbol matrix, i.e. step 260, to form a vector of transmit symbols in time-time domain can be implemented as depicted in block 241. In a first step a hermitian Fourier matrix $W^H$ is applied from the right on matrix $(S_M^N)^T$. The resulting matrix, i.e. $((S_M^N)^T W^H)$, is applied from the right on the symbol matrix using the Hadamard operator, i.e. the matrices are multiplied entrywise, wherein said Hadamard operation is denoted by $\circ$, thus leading to $(\bullet)\circ((S_M^N)^T W^H)$. The elements of the resulting matrix are summed up along the columns by applying a vector $1_N$ from the right, consisting of N ones. In this way the steps of upconverting the symbol matrix and selecting the diagonal entries can be implemented by applying an operation of $((\bullet)\circ((S_M^N)^T W^H))1_N$. The vector of transmit symbols x thus alternatively can be calculated as $X=((W^H\Gamma W S_N^M D)\circ((S_M^N)^T W^H))1_N$. Therein, the expression on the left side of the Hadamard operator denotes the filtered data symbols as output by 230, $W^H$ on the right side of the Hadamard operator is a Fourier matrix that contains complex valued oscillations with different frequencies in each column, which can be used to upconvert the columns of the matrix output by 230. With the operation $((S_M^N)^T W^H)$, the correct subcarrier center frequencies are selected in $W^H$ and by multiplying $((S_M^N)^T W^H)$ with the signal output from 230, each column of the resulting matrix is upconverted to the respective subcarrier center frequency. The functionality of the vector $1_N$ corresponds to the adder block 118. It is used to superposition, i.e. sum up, all subcarriers and yield the transmit signal x. As noted above all processing blocks can be implemented digitally using digital signal processor and appropriate software.

In step 270 a cyclic prefix is added to each of the selected symbols x to account for inter symbol interferences originating from a transmission in a time dispersive channel.

Note that this vector of transmit symbols is defined in the digital domain for transmission. The digital representation of the transmit vector is converted by a digital-to-analog converter thus producing an analog transmit signal, which may be amplified by a power amplifier before feeding the analog amplified transmit signal to at least one transmitter antenna. Note that the steps of digital-to-analog conversion, amplifying the analog signal and broadcasting the resulting transmit signal via the antenna are not depicted in FIG. 2

As mentioned above the matrix of symbols to be transmitted to a receiver may be defined in one of the four above mentioned domains. In one embodiment the matrix of symbols may be defined in the time-frequency domain as explained above, i.e. mapping device 112 in combination with blocks 113 and domain transfer unit 114 may output a matrix of symbols $D_{tf}$, i.e. a symbol matrix defined in the frequency-time domain. Alternatively mapping device 112 in combination with blocks 113 and domain transfer unit 114 may output a symbol matrix defined either in the time-time or frequency-time or frequency-frequency domain. The selection of the domain may for example depend on channel properties or on available computation power or other criteria.

For generating the symbol matrix a constellation of any modulation may be used, i.e. in one embodiment the constellation may be a higher order QAM constellation.

The matrix of symbols in any of the domains forms a data source, which in one embodiment may be defined in the time-frequency domain as illustrated in a). Note that the matrix is denoted as $D_{tf}$ wherein the indices t and f describe the domain the matrix is defined in. With respect to FIG. 1, that data source corresponds to a combination of mapping device 112 and device 113 and, if the matrix of symbols is required in any other than the time-frequency domain, in addition domain transfer unit 114.

Since the up-sampling requires matrix D in time-frequency domain, matrix $D_{tf}$ can be up-sampled without any further conversion. Note that the invention is not limited in this regard, since the method step of up-sampling can be performed in any of the domains, provided the up-sampling matrix is available in a corresponding domain. However in this embodiment we assume that the up-sampling is performed in the time-frequency domain, so the symbol matrix is to be provided in this domain to the up-sampling.

In case it is advantageous to provide the symbol matrix in the frequency-time domain, i.e. $D_{tf}$, mapping device 112 in combination with 113 maps the bits of data sequence 111 to symbols that shall be defined in frequency-time domain thus producing symbol matrix $D_{ft}$. To enable the up-sampling in 115, an additional processing unit, the domain transfer unit 114 is used. As depicted under b), an inverse Fourier transform $IFFT_1$ from the left using a hermitian matrix $W^H$ is applied to matrix $D_{ft}$ thus producing matrix $D_{tt}$, on which a Fourier transform $FFT_2$ is applied from the right to transform said matrix into the frequency-time domain, i.e. to produce $D_{tf}$. Note that the order of execution of applying the $IFFT_1$ and the $FFT_2$ to the symbol matrix can be exchanged.

In another embodiment, as illustrated in c), the bits of data stream 111 are mapped to a matrix of symbols defined in the time-time domain, thus producing matrix $D_{tt}$. In one embodiment this mapping can be achieved by transforming an existing matrix, in one example defined in the time-frequency domain as described above, and by subsequently transforming that into the time-time domain by applying a corresponding transformation in domain transfer unit 114. Matrix $D_{tt}$ is transformed into time-frequency domain by applying an inverse Fourier transform $IFFT_2$ from the right using Fourier matrix $W^H$ to provide the matrix of symbols in the domain appropriate for processing in upsampling block 115.

In embodiment d), i.e. if advantageous due to e.g. channel properties, the data bits may be mapped to a symbol matrix defined in frequency-frequency domain, thus producing a symbol matrix $D_{ff}$. An inverse Fourier transformation $IFFT_1$ is then applied to matrix $D_{ff}$ from the left using a hermitian matrix to transform the matrix into time-frequency domain thus producing $D_{tf}$, which can be forwarded to the upsampling processing 220 as described above.

In this way mapping device 112 may map bits of binary data stream 111 to symbols of a constellation, wherein said block of symbols, i.e. the matrix, may be defined in one of the frequency-time or in the time-frequency or in the time-time or in the frequency-frequency domain. Note that the receiver accordingly must detect the transmitted symbols in the domain in which these were mapped.

Similarly the method step of filtering the up-sampled symbols of the matrix may be performed in one of the domains. Note that in the embodiment depicted in FIG. 2 the filtering performed in processing block 230 assumes that matrix D is provided in time-frequency domain. Although we adhere to this assumption in the context of this description the invention is not limited in this regard. By applying Fourier transforms or inverse Fourier transforms any matrix, particularly a symbol matrix or a filter matrix, can be transformed into any domain of time and frequency combination.

In one embodiment, i.e. as depicted in e), the filtering matrix G can be defined in the time-frequency domain, i.e. $G_{tf}$. Filter matrix $G_{tf}$ can be applied directly to matrix $D_{tf}$ from the left. Note that in the following the indices of G indicate the domain in which the filter matrix is defined.

In an alternative embodiment, i.e. as depicted in f), the filter matrix can be defined in the frequency-time domain, i.e. $G_{ft}$, if advantageous. For that purpose, an $FFT_1$, i.e. a Fourier transform from the left is applied to the incoming upsampled data, then the filter $G_{ft}$ is applied from the left and then an inverse Fourier transform $IFFT_1$ from the left using a hermitian Fourier matrix is applied.

Alternatively, i.e. as depicted in g), the filter matrix can be defined in the frequency-frequency domain, i.e. $G_{ff}$. An inverse Fourier transform $IFFT_1$ is applied to the incoming data matrix X from the left using a hermitian Fourier matrix before applying the filter matrix to the matrix X in order to achieve the operands in matching domains.

Likewise filter matrix G can be defined in the time-time domain as illustrated in h), i.e. filter matrix $G_{tt}$. In this case a Fourier transformation $FFT_1$ is applied from the left to matrix X, before filter matrix $G_{tt}$ is applied to matrix X.

In this way the filter matrix can be defined in any of the domains to filter the symbol matrix as suitable for a channel exhibiting particular properties, wherein a filter defined in any of the domains may be applied to a symbols matrix containing symbols originally defined in any domain.

FIG. 3 illustrates the processing steps in a corresponding receiver 300 that basically reverses the processing steps performed in transmitter 200.

The radio signal as conveyed by channel 130, confer FIG. 1, is received by an antenna of the receiver. The analog signal as received by the antenna may be amplified, downconverted and the digitized by sampling and quantizing the received signal thus producing time samples of the received analog signal.

The stream of samples, each sample including a cyclic prefix (CP) or guard interval (GI) added in the transmitter; is fed into block 310, which removes the prefix from each time sample. Subsequently the time samples that are obtained after removing the CP or GI are equalized in block 320, which accordingly outputs equalized time samples.

In block 330 the time samples can be arranged to form a matrix Y consisting of a sequence of equalized time samples y, wherein the samples y form the diagonal elements of the matrix while all non-diagonal matrix elements are set to zero, thus yielding a matrix Y of size MN-by-MN, which form a block of time samples defined in time-time domain $$Y = \begin{pmatrix} y_0 & 0 & \cdots & 0 \\ 0 & y_1 & \ddots & \vdots \\ \vdots & \ddots & \ddots & 0 \\ 0 & \cdots & 0 & y_{NM-1} \end{pmatrix}$$

Subsequently, i.e. in block 340, the block of time samples is down converted by applying a Fourier transformation from the right and by subsequently down sampling by applying a sampling matrix $S_M^N$ from the right on that result, thus transforming the matrix of received time samples to the time-frequency domain, i.e. $Y\, WS_M^N$.

In an alternative embodiment, as depicted in block 341 denoting subcarrier downconversion, the processing of steps 330 and 340, i.e. arranging the time samples on the diagonal of a matrix, converting said matrix and down sampling that converted matrix can be achieved by arranging the time samples in a vector, applying a vector comprising ones only $1_N = [1, 1, \ldots, 1]^T$ from the right and performing entry-wise multiplication with a transposed matrix achieved by applying a Fourier transformation on down-sampling matrix $S_M^N$ (from the left). In this way the steps of 330 and 340 can be replaced by applying an operation of $((\cdot)1_N) \circ (WS_M^N)^T$ on the vector of received time samples.

Then a receiver filter 350, is applied to the matrix of received symbols. The receiver filter can be a matched filter that can be denoted by $W^H TW$, thus a matrix of filtered time samples $W^H TWY\, WS_M^N$ is obtained. Note that the matrix of time samples is provided in time-frequency domain to filter block 350. However, the filtering can be performed in any of the four domains, i.e. in the time-time or frequency-time or time-frequency or frequency-frequency domain.

As depicted in a) a receive filter $G_{tf}$, i.e. a filter in the time-frequency domain, can be applied to the matrix of time samples without transforming the received signal to another domain.

However, as described above and with reference to the transmitter signal processing, the digital signals can be filtered by a filter matrix defined in any of the four domains. This can be achieved by transforming the received signal from time-frequency domain to the desired domain in which the filter is to be applied before actually applying the filter.

In case the time samples shall be filtered in the frequency-time domain, illustrated in b), a Fourier transformation $FFT_1$ is applied from the left on the matrix of sample thus producing a transformed matrix, then filter matrix $G_{ft}$ is applied from the left on the transformed sample matrix thus producing a filtered sample matrix, and an inverse Fourier transformation $IFFT_1$ using a hermitian Fourier matrix is applied from the left onto the filtered matrix of samples to produce a filtered sample matrix in time-frequency domain.

Alternatively, as depicted in c), filtering can be performed using a filter matrix originally defined in the frequency-frequency domain, i.e. a filter matrix $G_{ff}$ is used. After said filter matrix has been applied to the matrix of samples an inverse Fourier transformation $IFFT_2$ using a hermitian Fourier matrix is applied from the right to the filtered sample matrix to produce a sample matrix in time-frequency domain.

In still another embodiment, as depicted in d), filtering can be performed using a filter matrix defined in time-time domain. Before applying matrix $G_{tt}$ onto the matrix of samples, an $FFT_1$ is applied from the left onto the matrix of samples, then filter matrix $G_{tt}$ is applied to the transformed matrix of samples, wherein applying the filter matrix $G_{tt}$ transforms the matrix of samples into time-frequency domain.

Note that the steps of filtering the matrix of samples do not change the domain the matrix of samples is defined in, so the filtered sample matrix, i.e. the matrix as output from filter 350, is in time-frequency domain as received from downconversion 340 after filtering 360.

Then the matrix of filtered time samples is down-sampled in block 360 thus reducing the number of samples in the matrix. This can be achieved by applying a sampling matrix $(S_N^M)^T$ from the left onto the time sample matrix, thus yielding a matrix of samples $\hat{D} = (S_N^M)^T W^H TWY\, WS_M^N$ The down-sampled matrix of samples $\hat{D}$ then is provided to detector block 370, which may be considered a data sink. Note that de-mapping of the matrix of samples to symbols of a constellation, i.e. detecting the symbols, requires that the domain of the samples matches the domain of symbols used when mapping bits to symbols at the transmitter side. Since down-sampling block 360 outputs the matrix of samples in frequency-time domain, the matrix may need to be transformed to the appropriate domain.

As depicted in embodiment e) the matrix of samples D can be processed without any conversion in case the data block has been defined in the transmitter in the time-frequency domain.

In case the data have been mapped at the transmitter side to a matrix of symbols defined in the frequency-time domain an inverse Fourier transformation $IFFT_2$ using a hermitian Fourier matrix is applied from the right and a Fourier transformation $FFT_1$ is applied from the left on sample matrix $\hat{D}$ to transform the matrix of samples into frequency-time domain as depicted in embodiment f). The resulting sample matrix in the frequency-time domain is then forwarded to a detector for detecting the samples in frequency-time domain.

In case the data have been mapped to a data block defined in frequency-frequency domain in the transmitter so the detecting must use that domain correspondingly, an inverse Fourier transformation $IFFT_1$ using a hermitian Fourier matrix is applied from the right onto the matrix of samples $\hat{D}$, which transforms the matrix from the time-frequency domain into frequency-frequency domain as depicted in embodiment g). The resulting sample matrix, i.e., $\hat{D}_{ff}$, is then provided to the detector.

If the data in the transmitter have been mapped to a symbol matrix defined in time-time domain, then a Fourier transformation $FFT_1$ is applied from the left on the sample matrix $\hat{D}$ to achieve a sample matrix $\hat{D}_{tt}$, which is then processed in the detector to perform the detection of the symbols in time-time domain.

In this way a transmitter may form a symbol matrix reflecting a sequence of binary input data, wherein the symbol matrix may be defined and filtered in either the frequency-time or the time-frequency the time-time or frequency-frequency domain, thus enabling filtering in the most suitable domain, wherein said domain depends e.g. on the characteristics of the transmit channel. A corresponding receiver, having knowledge of the corresponding domain to de-map the symbols to binary data, may correspondingly transform the received signals to that domain, may filter and then de-map the received signals in the respective domain.

In one embodiment and as described above the transmitter may generate a matrix of symbols in the time-frequency domain. The frequency-time domain may be chosen in particular in scenarios providing limited processing resources. In the transmitter the matrix of symbols can be generated and processed using only little processing resources, since the upsampling and filtering can be performed without transforming the matrix in-between.

In an alternative embodiment, in case the channel exhibits significant frequency selective fading, i.e. the channel exhibits a small coherence bandwidth, the frequency-frequency domain may be advantageous. In the frequency-frequency domain the energy of one symbol is concentrated onto a comparatively small fraction of the entire bandwidth and can be compensated in case of cancellation by a single-tap equalizer operating in the frequency-frequency domain.

In still another embodiment the time-time domain may be chosen advantageously in case the channel exhibits significant fading over time, i.e. the channel exhibits a short coherence time. In this case the filtering is performed advantageously in time-time domain.

The selection of the processing domain for processing an entire block of symbols, i.e. a matrix of symbols, in this way may depend on channel properties. However, considering that processing in a particular domain may come at the price of higher costs in terms digital processing resources, the selection of a processing domain may also depend on available processing resources. In one embodiment, particularly in cases of limited processing resources, the frequency-time domain may be chosen, since the processing in this domain may require comparatively few processing resources. Since a receiver is required to detect i.e. at least to de-map, a received signal in the domain that was used by the transmitter, the selection of a processing domain in the transmitter may also depend on processing resources available in a receiver.

In an alternative embodiment sections of a block of data symbols D may be processing in different domains. Data symbols to be transmitted via different carrier frequencies may undergo different distortions, i.e. carrier frequencies of a group of frequencies may exhibit frequency selectivity, i.e. these frequencies exhibit a small coherence bandwidth, while other carrier frequencies used in the same block of symbols exhibit a short coherence time, i.e. these frequencies exhibit significant fading over time. In order to optimize the transmission of symbols using these frequencies the block of symbols may be separated into sections, i.e. at least two sections, wherein symbols of these sections are generated and processed in different domains.

In one embodiment a block of data symbols D may comprise a first section or symbols using a first portion of available transmit resources. The first portion of available transmit resources may exhibit first channel properties, e.g. the channel may exhibit small coherence time, and may be assigned to a first user/receiver. The block of data symbols D may comprise a second section of symbols using a second portion of available transmit resources, wherein said second transmit resources may exhibit second, i.e. different channel properties, e.g. a small coherence bandwidth. Said second portion of data symbols, which correspond to said second transmit resources, may be assigned to a second user/receiver. According to the respective channel properties, the data symbols of the first section may be generated and processed in a first domain, i.e. for example in time-time domain and data symbols of the second section may be generated and processed in a second domain, i.e. filtered in the transmitter, in frequency-frequency domain.

Note that the processing in different domains spreads given input data in different ways among all available resources. When the signals from the different domains are to be combined, guard times or guard bands can be employed to adjust the level of mutual interference.

In an alternative embodiment a spread spectrum technique can be used to underlay the signal of one domain (e.g. time-time) under the signal in another domain (e.g. time-frequency). In that case the signals from the two domains can be recovered separately at the receiver by well known techniques. By employing spread spectrum techniques, the bandwidth of a system's transmit signal x is increased by multiplying each sample of x with one of a number of typically pseudo-random sequences, yielding an increased number of samples that occupy a higher bandwidth, but can be transmitted with lower absolute signal power. At the receiver, this procedure is reversed by correlating the received samples with the aforementioned pseudo-random sequences. This allows the superposition of multiple communication systems with limited mutual impact, when one operates with spread spectrum technique while another does not. In the context of this invention, spread spectrum techniques are particularly relevant for the realization of multi-user access, e.g. in a cellular communication system, where different users are assigned different signal domains and those signals/domains are separated by described technique.

As mentioned above the processing the transmitter can be implemented fully digital until the vector of transmit symbols is converted from digital to analog. The analog signal can be amplified and further processed and lastly is radiated via an antenna. In particular the digital processing, which largely is operating of matrices, can be implemented using a digital signal processor in combination with a set of instructions, i.e. software, adapted and configured to perform the above described functionality. The described invention accordingly can be implemented using suitable means to perform the described processing steps, wherein in one embodiment said suitable means may be a digital signal processor adapted and configured to execute the software, which in turn specifies the processing steps.

In one embodiment the digital signal processor can be a multipurpose processor running on an arbitrary operating system and executing software code, wherein the software code comprises suitable instructions implementing all of the above mentioned method steps in a transmitter and accordingly may output a signal that can be coupled to a digital-to-analog converter. Similarly a multipurpose processor can be employed for processing a received signal once the received signal is converted to the digital domain.

In alternative embodiments application specific integrated circuits, i.e. so-called ASICs, can be employed to perform the above mentioned digital processing steps, wherein one or more ASICs can be used to perform the method steps. The at least one ASIC may be particularly adapted and configured for performing at least a portion of the method steps. Accordingly one ASIC capable of performing all digital method steps can be used to implement the method steps a transmitter or a receiver.

The invention can be extended from two to an arbitrary number of dimensions n, thus yielding in total $2^n$ domains for representing the data. For example one additional dimension can be obtained when additionally multiple input multiple output (MIMO) systems with Tx and Rx antenna arrays are used. In that case, D becomes a 3 dimensional hypermatrix, where the first dimension denotes the time slots, the second dimension denotes the subcarriers and the third dimension denotes the transmit antenna.

In order to process such a hypermatrix, the functionality of the Tx domain transfer unit 114 of the transmitter chain 110 is extended such that it is additionally capable of performing the operation $FFT_3/IFFT_3$. i.e. transformations along the third dimension of D. This yields 8 different domains. The hypermatrix D that comes out of block 114 undergoes processing in parallel branches, where in each the functionality of block 115-120 is performed on a slice of the hypermatrix. Finally the outputs of these branches are connected to a Tx antenna array for MIMO transmission.

Similarly, at the receiver 140, a Rx multi-antenna array yields a number of parallel receive sequences that undergo the processing 141-146 in parallel. The Rx domain transfer unit is also extended with the $FFT_3/IFFT_3$ operations and transfers the signal to the appropriate Rx domain, depending on what transformations have been performed in block 114 of the transmitter, yielding a received hypermatrix $\hat{D}$ from which the data can be extracted.

The invention claimed is:

1. A method for transmitting data on multiple carriers, comprising the steps of:
    mapping data to symbols and arranging the symbols to form a K-by-M matrix D of symbols $d_{km}$, wherein $0 \leq k < K$ and $K > 1$ and $0 \leq m < M$ and $M > 1$;
    filtering the matrix of symbols using a filter thereby producing a matrix of filtered symbols, wherein the filter domain is dynamically selected from a group comprising the time-time domain and the time-frequency domain and the frequency-time domain and the frequency-frequency domain depending on current transmit channel properties;
    applying at least one Fourier or inverse Fourier transformation on the matrix of filtered symbols thereby producing a matrix of transformed filtered symbols;
    forming a transmit vector from the diagonal elements of the matrix of transformed filtered symbols; and
    transmitting the transmit vector.

2. The method of claim 1 further comprising the step of adding a cyclic prefix or guard interval to the transmit vector.

3. The method of claim 1 wherein the step of filtering the matrix of symbols comprises the step of applying at least one of a Fourier transformation or an inverse Fourier transformation to the matrix of symbols.

4. The method of claim 1 further comprising the step of upsampling the matrix of symbols before filtering the matrix of symbols.

5. The method of claim 1 further comprising the step of multiplying samples of the transmit vector by a pseudo-random spread sequence.

6. The method of claim 1 wherein a plurality of at least two antennas is used for transmitting.

7. The method of claim 1 wherein the step of mapping data to symbols and arranging the symbols to form a the matrix D of symbols comprises
    assigning a first portion of symbols to a first user, said first portion of symbols being defined in a first domain, and
    assigning a second portion of symbols to a second user, said second portion of symbols being defined in a second domain.

8. A method for receiving data, comprising the steps of:
    receiving a radio signal and producing digital samples from the received signal;
    forming a matrix of samples wherein the digital samples of the received signal form diagonal elements of said matrix of samples;
    downconverting the matrix of samples;
    filtering the matrix of samples using a filter, wherein the filter domain is dynamically selected from a group comprising the frequency-time and the time-frequency and the time-time and the frequency-frequency domain depending on current transmit channel properties and corresponding to the filtering at a transmitter thus producing a matrix of filtered samples;
    downsampling the matrix of filtered samples thereby producing a matrix of downsampled filtered samples; and
    detecting symbols represented by samples of the matrix of downsampled filtered samples in the frequency-time or time-frequency or time-time or frequency-frequency domain.

9. The method of claim 8 further comprising the step of:
    removing a cyclic prefix or guard interval from the digital samples of the received signal.

10. The method of preceding claim 8 wherein the step of filtering the matrix of samples comprises the step of applying at least one of a Fourier transformation or an inverse Fourier transformation to the matrix samples.

11. The method of claim 8 further comprising the step of:
    equalizing the digital samples of the received signal.

12. The method of claim 8, wherein the step of downconverting the matrix of samples comprises
    applying a Fourier transformation to the matrix of samples, and
    down-sampling the matrix of samples by applying a sampling matrix on the matrix of samples.

13. The method of claim 8, further comprising the step of de-spreading the digital samples of the received signal by a pseudo-random spread sequence.

14. The method of claim 8 wherein a plurality of antennas is used for receiving the radio signal.

15. A transmitter device adapted and configured to perform the method steps of claim 1.

16. A receiver device adapted and configured to perform the method steps of claim 8.

\* \* \* \* \*